US012085770B2

(12) United States Patent
Kang et al.

(10) Patent No.: US 12,085,770 B2
(45) Date of Patent: Sep. 10, 2024

(54) OPTICAL SUBMODULE

(71) Applicant: ELECTRONICS AND TELECOMMUNICATIONS RESEARCH INSTITUTE, Daejeon (KR)

(72) Inventors: Sae-Kyoung Kang, Daejeon (KR); Joon Young Huh, Daejeon (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 149 days.

(21) Appl. No.: 17/872,044

(22) Filed: Jul. 25, 2022

(65) Prior Publication Data
US 2023/0115731 A1    Apr. 13, 2023

(30) Foreign Application Priority Data

Oct. 13, 2021 (KR) .................. 10-2021-0135508
Feb. 11, 2022 (KR) .................. 10-2022-0018212

(51) Int. Cl.
*H04B 10/00* (2013.01)
*G02B 6/42* (2006.01)

(52) U.S. Cl.
CPC ......... *G02B 6/4281* (2013.01); *G02B 6/4246* (2013.01)

(58) Field of Classification Search
CPC ... G02B 6/4281; G02B 6/4246; G02B 6/4279
See application file for complete search history.

(56) References Cited

U.S. PATENT DOCUMENTS 6,445,475 B1 * 9/2002 Okubora ............... G02B 6/428
                                                  398/141
6,617,518 B2 * 9/2003 Ames ..................... H01R 12/62
                                                  174/262

(Continued)

FOREIGN PATENT DOCUMENTS

JP    2008-67164 A    3/2008
JP    4566089 B2      8/2010

(Continued)

OTHER PUBLICATIONS

Sae-Kyoung Kang et al., "Verification of hybrid-integrated 400-GB/s (4 × 100 GB/s) CWDM4 ROSA using a bandwidth-improved multilayer board", vol. 28, No. 22, Oct. 26, 2020, Optics Express 3309.

*Primary Examiner* — Agustin Bello
(74) *Attorney, Agent, or Firm* — LRK PATENT LAW FIRM

(57) ABSTRACT

Provided is an optical submodule which includes an optical transmission/reception module that optically couples an optical transmission signal and an optical reception signal into one optical fiber and a flexible printed circuit board (FPCB) mounted on the optical transmission/reception module that functions as an electrical signal interface with a main board, and an electrical signal line of an optical transmission channel for the optical transmission signal and an electrical signal line of an optical reception channel for the optical reception signal may be deployed on different sides of the FPCB.

3 Claims, 5 Drawing Sheets

(56) References Cited

U.S. PATENT DOCUMENTS

| | | | |
|---|---|---|---|
| 6,712,527 B1* | 3/2004 | Chan | G02B 6/4292 385/88 |
| 7,153,043 B1* | 12/2006 | Zhang | G02B 6/4283 385/92 |
| 7,309,173 B2* | 12/2007 | Epitaux | H05K 1/189 385/88 |
| 7,439,449 B1* | 10/2008 | Kumar | H05K 1/147 174/254 |
| 7,478,953 B2* | 1/2009 | Tanaka | G02B 6/4246 398/139 |
| 7,811,007 B2* | 10/2010 | Kunii | H05K 1/189 385/88 |
| 8,057,109 B2* | 11/2011 | Flens | H05K 1/147 385/88 |
| 8,503,884 B2 | 8/2013 | Lee et al. | |
| 8,596,885 B2* | 12/2013 | Karnopp | H04B 10/40 385/88 |
| 8,611,094 B2* | 12/2013 | Aruga | H05K 1/0219 174/268 |
| 8,678,674 B2* | 3/2014 | Kunii | H04B 10/40 385/92 |
| 8,777,496 B2* | 7/2014 | Kuwahara | H05K 1/118 361/679.01 |
| 8,817,478 B2* | 8/2014 | Kodera | H05K 3/363 361/749 |
| 8,936,399 B2* | 1/2015 | Chen | G02B 6/4263 385/88 |
| 9,250,404 B2* | 2/2016 | Lim | G02B 6/428 |
| 9,568,695 B2* | 2/2017 | Huang | G02B 6/4281 |
| 9,638,876 B2* | 5/2017 | Schamuhn | G02B 6/4246 |
| 9,891,396 B2* | 2/2018 | Ban | H05K 3/363 |
| 10,001,610 B2* | 6/2018 | Komatsu | G02B 6/4263 |
| 10,122,464 B2* | 11/2018 | Sugiyama | H05K 3/363 |
| 10,230,470 B2* | 3/2019 | Lin | H05K 1/0218 |
| 10,231,327 B1* | 3/2019 | Murakami | H05K 1/0219 |
| 10,379,301 B2* | 8/2019 | Luo | G02B 6/32 |
| 10,608,408 B1* | 3/2020 | Lin | G02B 6/4274 |
| 10,704,748 B2* | 7/2020 | Shimada | H01S 5/022 |
| 11,089,683 B2* | 8/2021 | Noguchi | H05K 1/0215 |
| 11,327,258 B2* | 5/2022 | Kamitsuna | G02B 6/4268 |
| 2003/0085054 A1* | 5/2003 | Ames | H01R 12/62 174/254 |
| 2005/0012199 A1* | 1/2005 | Rosenau | H05K 1/189 257/688 |
| 2005/0168957 A1* | 8/2005 | Kawauchi | G02B 6/4292 361/783 |
| 2007/0053639 A1* | 3/2007 | Aruga | G02B 6/4281 385/94 |
| 2007/0058980 A1* | 3/2007 | Hidaka | G02B 6/4279 398/138 |
| 2008/0031574 A1* | 2/2008 | Tanaka | H05K 1/189 385/88 |
| 2009/0285580 A1* | 11/2009 | Yasuda | G02B 6/4284 398/139 |
| 2009/0290619 A1* | 11/2009 | Flens | H05K 1/147 375/219 |
| 2009/0324238 A1* | 12/2009 | Kunii | H05K 1/189 398/135 |
| 2010/0006863 A1* | 1/2010 | Ban | H05K 1/189 257/E33.076 |
| 2010/0215324 A1* | 8/2010 | Ban | G02B 6/4281 385/88 |
| 2011/0008056 A1* | 1/2011 | Yagisawa | H05K 1/147 174/254 |
| 2011/0052124 A1* | 3/2011 | Karnopp | G02B 6/4246 385/88 |
| 2012/0008289 A1* | 1/2012 | Aruga | G02B 6/4281 361/749 |
| 2012/0087136 A1* | 4/2012 | Kuwahara | H05K 1/118 361/679.01 |
| 2012/0148185 A1* | 6/2012 | Chen | G02B 6/4292 385/14 |
| 2013/0077978 A1* | 3/2013 | Duis | H04B 10/40 398/139 |
| 2013/0094864 A1* | 4/2013 | Duis | G02B 6/4246 398/139 |
| 2013/0141880 A1* | 6/2013 | Karnopp | G02B 6/4281 361/749 |
| 2013/0322833 A1* | 12/2013 | Hirayama | H05K 1/025 385/92 |
| 2014/0029900 A1* | 1/2014 | Logan, Jr. | G02B 6/3821 29/874 |
| 2014/0056592 A1* | 2/2014 | McColloch | H04B 10/40 29/428 |
| 2014/0294351 A1* | 10/2014 | Huang | G02B 6/4245 385/89 |
| 2015/0003839 A1* | 1/2015 | Minota | G02B 6/4284 398/138 |
| 2015/0253593 A1* | 9/2015 | Sugiyama | G02B 6/125 385/40 |
| 2015/0316732 A1* | 11/2015 | Schamuhn | H04B 10/40 398/139 |
| 2016/0095211 A1* | 3/2016 | Goto | H05K 3/363 361/748 |
| 2016/0112137 A1* | 4/2016 | Pfnuer | H04B 10/503 398/183 |
| 2016/0286657 A1* | 9/2016 | Ban | H05K 3/363 |
| 2017/0093488 A1* | 3/2017 | Wang | H04J 14/0227 |
| 2017/0168255 A1* | 6/2017 | Komatsu | H05K 1/111 |
| 2018/0145759 A1* | 5/2018 | Kasai | H04B 10/40 |
| 2018/0180828 A1* | 6/2018 | Zhao | H05K 1/181 |
| 2018/0287705 A1* | 10/2018 | Lin | G02B 6/12004 |
| 2019/0052049 A1* | 2/2019 | Sato | H01S 5/4012 |
| 2019/0181954 A1* | 6/2019 | Kawase | H01S 5/02325 |
| 2019/0182949 A1* | 6/2019 | Misawa | H05K 1/118 |
| 2020/0116961 A1* | 4/2020 | Ding | G02B 6/4256 |
| 2021/0033806 A1* | 2/2021 | Noguchi | G02B 6/4206 |
| 2021/0059050 A1* | 2/2021 | Noguchi | H05K 1/028 |
| 2021/0103109 A1* | 4/2021 | Carley | H05K 1/189 |
| 2021/0247576 A1* | 8/2021 | Oomori | G02B 6/2938 |
| 2021/0399805 A1* | 12/2021 | Masuda | G02B 6/4292 |
| 2022/0236506 A1* | 7/2022 | Mizuno | G02B 6/4281 |
| 2022/0337022 A1* | 10/2022 | Zhang | G02B 6/4281 |
| 2022/0404563 A1* | 12/2022 | Liu | H01S 5/0233 |
| 2022/0416901 A1* | 12/2022 | Yoshimura | H01S 5/4012 |
| 2023/0115731 A1* | 4/2023 | Kang | G02B 6/4246 385/88 |

FOREIGN PATENT DOCUMENTS

| | | |
|---|---|---|
| JP | 4581636 B2 | 9/2010 |
| JP | 2015-55834 A | 3/2015 |

* cited by examiner

OPTICAL SUBMODULE

CROSS-REFERENCE TO RELATED APPLICATIONS

This application claims the benefit of Korean Patent Application No. 10-2021-0135508 filed on Oct. 13, 2021, and Korean Patent Application No. 10-2022-0018212 filed on Feb. 11, 2022, in the Korean Intellectual Property Office, the entire disclosures of which are incorporated herein by reference for all purposes.

BACKGROUND

1. Field of the Invention

One or more example embodiments relate to an optical submodule, and, more specifically, to a structure of a flexible printed circuit board (FPCB) that functions as a high-speed electrical signal interface for an optical transmission/reception module that functions as an optical transmission/reception interface in an optical submodule.

2. Description of Related Art

The optical transmission/reception module is a core module that receives an electrical signal and converts it into an optical signal and receives an optical signal and converts it into an electrical signal. The optical submodule is responsible for an optical interface at the end of an optical transmission system. As the amount of data to be transmitted increases, development of the optical transmission module and the optical reception module, which are core components of the optical submodule, is being accelerated and the modules are being miniaturized.

The optical transmission/reception module may be implemented in a form in which a parallel connection and a wavelength division multiplexing (WDM) connection are possible using a plurality of channels to increase the data transmission speed and may be implemented in various types of packages.

When the optical transmission/reception module uses a plurality of channels to continuously increase the transmission speed, electrical crosstalk may occur between adjacent channels. This is a part to be considered when designing the path of a high-speed electrical signal in the optical transmission/reception module using a high-order modulation method (e.g., the PAM4 modulation method) sensitive to noise characteristics.

In general, a high-speed electrical signal and a direct current (DC) electrical signal between the optical transmission/reception module and the optical submodule may be connected using the FPCB, and as the number of channels increases, the distance between channels decreases, and the crosstalk between channels in the FPCB increases, thereby causing distortion of a signal waveform.

Therefore, in order to solve this problem, an efficient structure is required for the FPCB mounted on the optical transmission/reception module using a plurality of channels to connect an optical transmission signal and an optical reception signal to a main board.

SUMMARY

The example embodiments provide a structure of a flexible printed circuit board (FPCB) mounted on an optical transmission/reception module using a plurality of channels and serving as an electrical signal interface with a main board.

More specifically, the example embodiments provide, on the FPCB mounted on a bidirectional optical transmission/reception module that optically couples an optical transmission signal and an optical reception signal to one optical fiber, a structure in which an electrical signal line of an optical transmission channel for an optical transmission signal and an electrical signal line of an optical reception channel for an optical reception signal are deployed on different sides.

In addition, the example embodiments provide, on the FPCB mounted on the optical transmission/reception module that optically couples an optical transmission signal of a plurality of channels or an optical reception signal of a plurality of channels into one optical fiber or the number of optical fibers corresponding to a plurality of channels, a structure in which an electrical signal line for an optical transmission signal of a plurality of channels or an electrical signal line for an optical reception signal of a plurality of channels are deployed in a zigzag pattern on different sides.

According to an example embodiment, the optical submodule may include the optical transmission/reception module that optically couples an optical transmission signal and an optical reception signal to one optical fiber and the FPCB mounted on the optical transmission/reception module that performs as an electrical signal interface with a main board, and an electrical signal line of an optical transmission channel for the optical transmission signal and an electrical signal line of an optical reception channel for the optical reception signal may be deployed on different sides on the FPCB.

A separated ground may be applied to the optical transmission channel and the optical reception channel on the FPCB.

The optical transmission/reception module may be a box-type.

According to an example embodiment, the optical submodule may include the optical transmission/reception module that optically couples an optical transmission signal and an optical reception signal to one optical fiber, the FPCB for a high-speed electrical signal mounted on the optical transmission/reception module that performs as an electrical signal interface with a main board, and an FPCB for a direct current (DC) electrical signal, and an electrical signal line of an optical transmission channel for the optical transmission signal and an electrical signal line of an optical reception channel for the optical reception signal may be deployed on different sides on the FPCB for the high-speed electrical signal.

The FPCB for the high-speed electrical signal and the FPCB for the DC electrical signal may be mounted to face each other in a vertical direction.

A separated ground may be applied to the optical transmission channel and the optical reception channel on the FPCB for the high-speed electrical signal and the FPCB for the DC electrical signal, respectively.

A ground may be applied to a surface facing the FPCB for a high-speed electrical signal and the FPCB for the DC electrical signal.

According to an example embodiment, the optical submodule may include the optical transmission/reception module that optically couples an optical transmission signal of a plurality of channels or an optical reception signal of a plurality of channels into one optical fiber or the number of optical fibers corresponding to a plurality of channels, the FPCB for a high-speed electrical signal mounted on the optical transmission/reception module that performs as an electrical signal interface with a main board, and the FPCB for a DC electrical signal, and an electrical signal line for an optical transmission signal of the plurality of channels or an electrical signal line for an optical reception signal of the plurality of channels may be deployed in a zigzag pattern on different sides on the FPCB for the high-speed electrical signal.

The FPCB for the high-speed electrical signal and the FPCB for the DC electrical signal may be mounted in a form facing each other in a vertical direction.

A ground may be applied to a surface facing the FPCB for the high-speed electrical signal and the FPCB for the DC electrical signal.

According to an example embodiment, on the FPCB mounted on a bidirectional optical transmission/reception module that optically couples an optical transmission signal and an optical reception signal to one optical fiber, electrical crosstalk between an optical transmission channel and an optical reception channel may be reduced by deploying an electrical signal line of an optical transmission channel for an optical transmission signal and an electrical signal line of an optical reception channel for an optical reception signal on different sides.

In addition, according to an example embodiment, on the FPCB mounted on the optical transmission/reception module that optically couples an optical transmission signal of a plurality of channels or an optical reception signal of a plurality of channels into one optical fiber or the number of optical fibers corresponding to a plurality of channels, electrical crosstalk between very adjacent channels of a plurality of channels may be reduced by deploying an electrical signal line for an optical transmission signal of a plurality of channels or an electrical signal line for an optical reception signal of a plurality of channels in a zigzag pattern on different sides.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, the example embodiments will be described in detail with reference to the accompanying drawings.

Figure 1A:
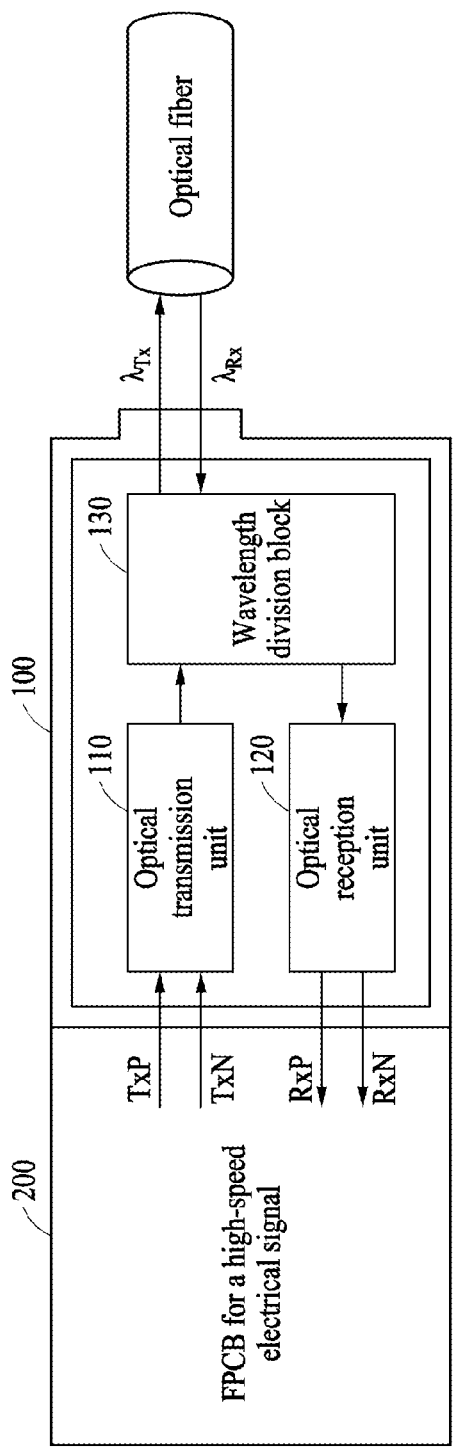
FIGS. 1A and 1B are configuration diagrams illustrating a bidirectional optical transmission/reception module according to an example embodiment.
Figure 1B:
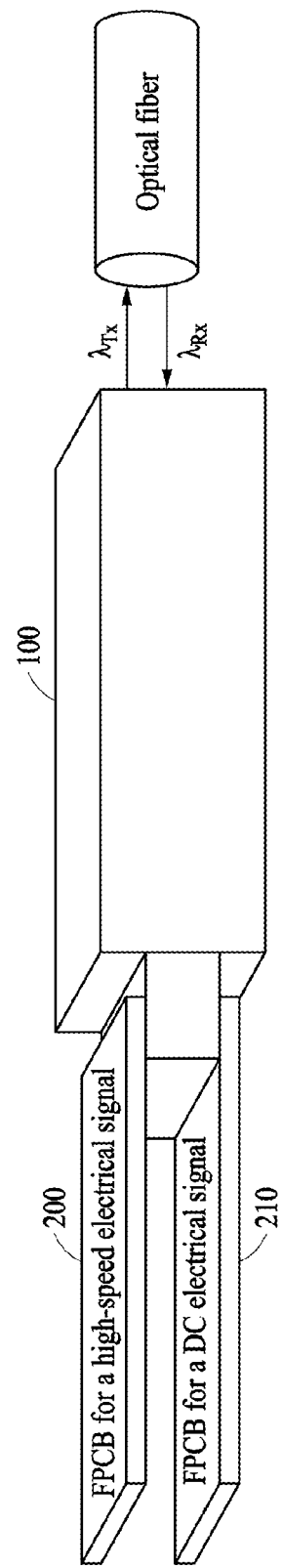

FIGS. 1A and 1B are configuration diagrams illustrating a bidirectional optical transmission/reception module according to an example embodiment.

Referring to FIGS. 1A and 1B, a bidirectional optical transmission/reception module 100 may optically couple an optical transmission signal and an optical reception signal to an optical fiber through a wavelength division block 130 by setting a wavelength of an optical transmission signal output by an optical transmission unit 110 differently from a wavelength of an optical reception signal received by an optical reception unit 120. That is, the bidirectional optical transmission/reception module 100 has the advantage of using only one optical fiber for transmitting an optical transmission/reception signal, and is used in an optical subscriber network, a mobile network, and the like.

The optical transmission unit 110 of the bidirectional optical transmission/reception module 100 may include a light source, a driving amplifier, and the like, and the optical reception unit 120 may include a photodiode, a transimpedance amplifier, and the like. In this case, the bidirectional optical transmission/reception module 100 may optically couple an optical transmission signal and an optical reception signal with one optical fiber and transmit through a wavelength division block by using the wavelength ($\lambda Tx$) of an optical transmission signal that is different from the wavelength ($\lambda Rx$) of an optical reception signal.

Referring to FIG. 1A, a high-speed electrical signal (TxP, TxN) for an optical transmission and a high-speed electrical signal (RxP, RxN) for optical reception may be input and output through the FPCB 200 for a high-speed electrical signal on the same plane along one side of the bidirectional optical transmission/module 100 and the optical transmission signal and the optical reception signal may be optically coupled through one optical fiber on the opposite side of the bidirectional optical transmission/reception module 100.

In this case, the bidirectional optical transmission/reception module 100 may be a box-type or a package-type equivalent thereto and the electrical connection distance from the bidirectional optical transmission/reception module 100 and the optical submodule to a main board may be minimized.

Through the package-type bidirectional optical transmission/reception module 100, a loss of electrical signal transmitted and received between the bidirectional optical transmission/reception module 100 and the main board of the optical submodule may be minimized and ease of arrangement of components constituting the optical submodule may be provided.

FIG. 1B is a diagram illustrating a structure in which the FPCB 200 is mounted on the bidirectional optical transmission/reception module 100. Referring to FIG. 1B, the FPCB 200 for a high-speed electrical signal and the FPCB 210 for a direct current (DC) electrical signal may be mounted on the bidirectional optical transmission/reception module 100 in a form that faces each other in a vertical direction.

Figure 2:
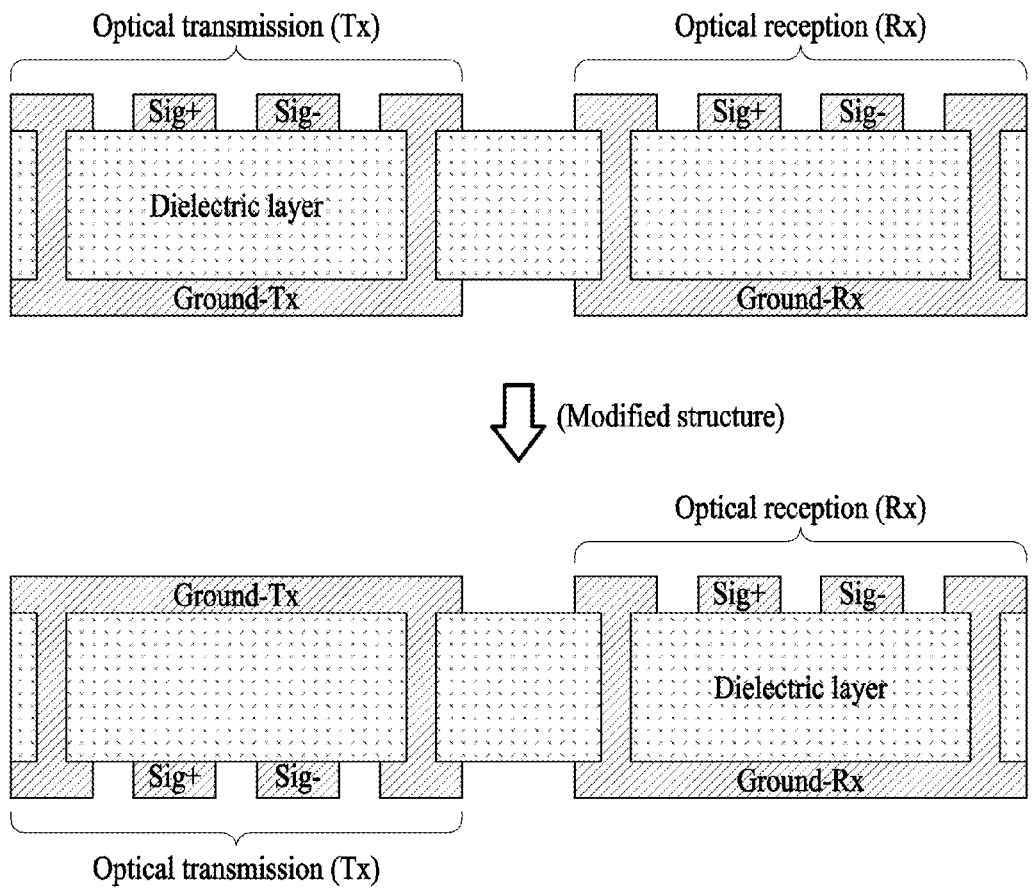
FIG. 2 is a diagram illustrating a structure of an FPCB for a high-speed electrical signal according to an example embodiment.

When the FPCB 200 for the high-speed electrical signal and the FPCB 210 for the DC electrical signal are mounted facing each other in a vertical direction, a structure of the FPCB 200 for a high-speed electrical signal that is resistant to noise that may be induced between a high-speed electrical signal and a DC electrical signal is illustrated in FIG. 2.

FIG. 2 is a diagram illustrating a structure of the FPCB for a high-speed electrical signal according to an example embodiment.

Referring to FIG. 2, a structure of the FPCB 200 for a high-speed electrical signal that performs as a high-speed electrical signal interface of an optical transmission channel and an optical reception channel is illustrated. On a conventional FPCB for a high-speed electrical signal, an electrical signal line of an optical transmission channel and an electrical signal line of an optical reception channel are deployed on the same plane, and thus there is a high probability of electrical crosstalk between the optical transmission channel and the optical reception channel.

However, on the FPCB 200 for a high-speed electrical signal proposed in the present disclosure, electrical crosstalk may be reduced as compared with the conventional FPCB for a high-speed electrical signal by deploying an electrical signal line of an optical transmission channel and an electrical signal line of an optical reception channel on different sides (e.g., an opposite side).

Figure 3:
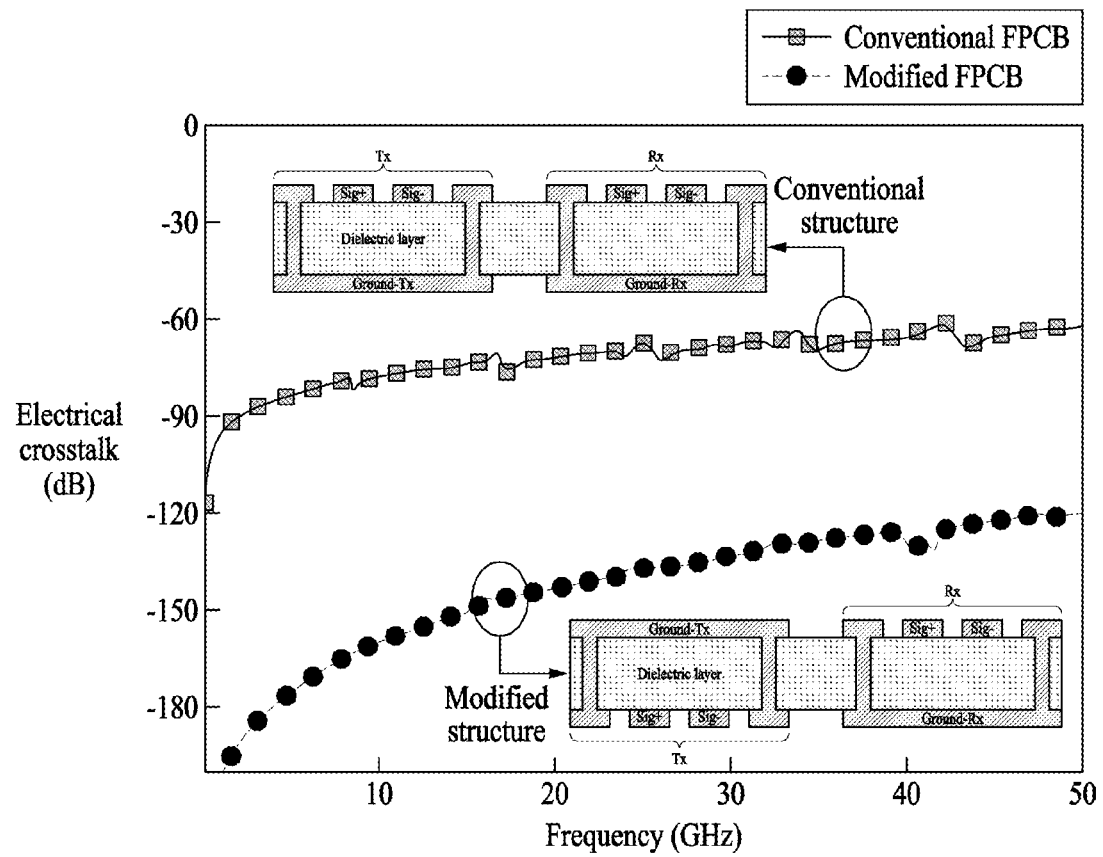
FIG. 3 is a diagram illustrating a result of calculating electrical crosstalk in a structure of an FPCB for a high-speed electrical signal according to an example embodiment.

FIG. 3 is a diagram illustrating a result of calculating electrical crosstalk in a structure of the FPCB for a high-speed electrical signal according to an example embodiment.

Referring to FIG. 3, a result of calculating electrical crosstalk through electromagnetic (EM) simulation between the optical transmission channel and the optical reception channel generated from the conventional FPCB for a high-speed electrical signal and the FPCB 200 for a high-speed electrical signal proposed in the present disclosure is illustrated.

Referring to FIG. 3, the structure of the FPCB 200 for a high-speed electric signal proposed in the present disclosure has an improvement of 60 dB or more up to the 50 GHz region compared to the structure of the conventional FPCB for a high-speed electric signal. In this case, in each structure, a separated ground may be applied to the optical transmission channel and the optical reception channel.

Figure 4A:
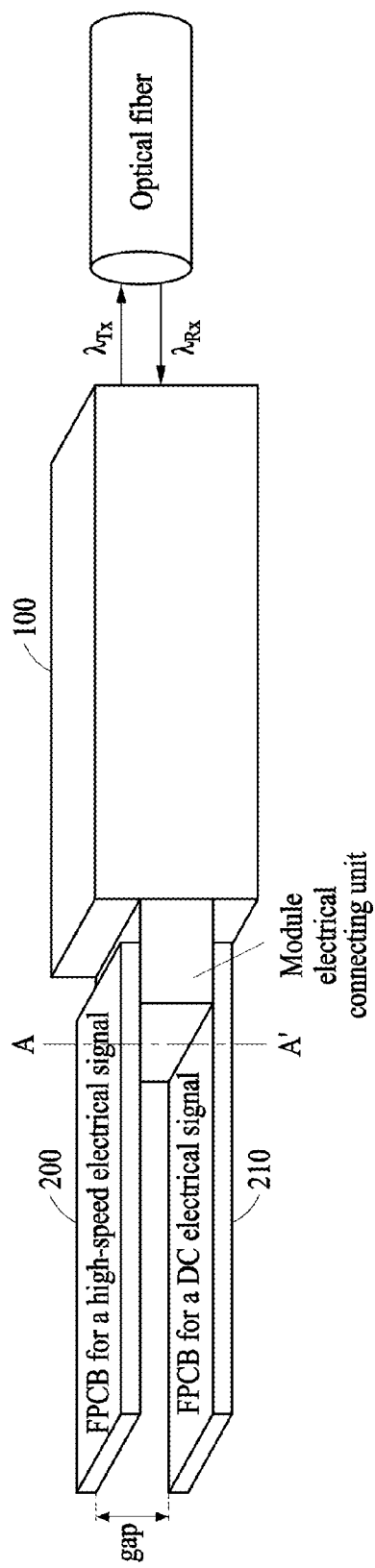
FIGS. 4A and 4B are diagrams illustrating a structure of an FPCB for a direct current (DC) electrical signal in accordance with a structure of an FPCB for a high-speed electrical signal according to another example embodiment.
Figure 4B:
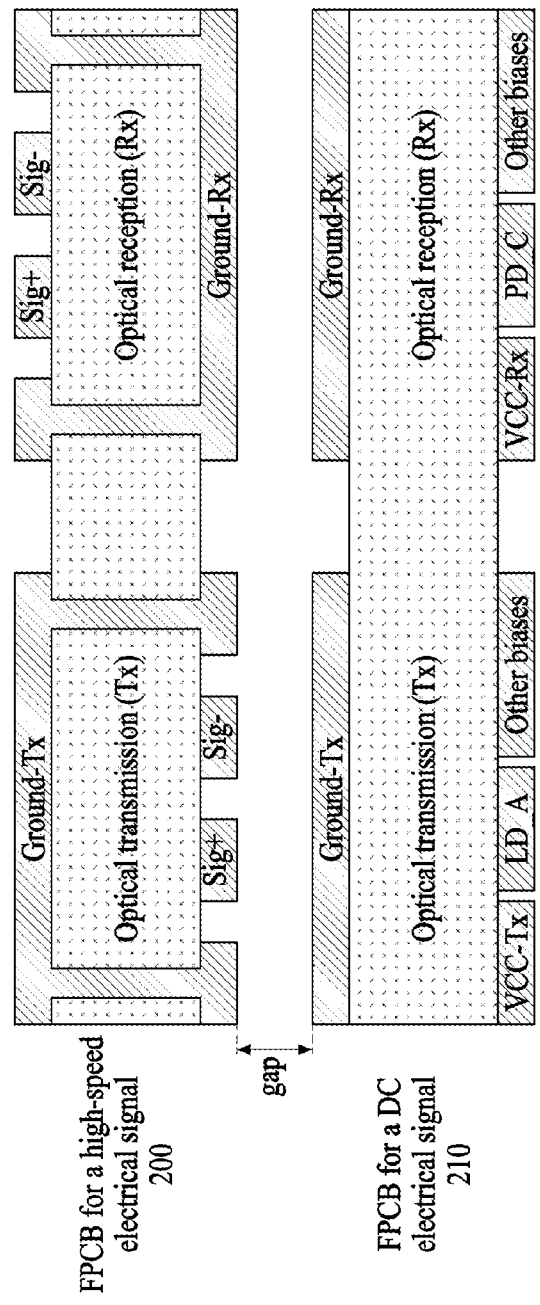

FIGS. 4A and 4B are diagrams illustrating a structure of the FPCB for a DC electrical signal in accordance with a structure of the FPCB for a high-speed electrical signal according to another example embodiment.

Referring to FIG. 4A, the FPCB 200 for a high-speed electrical signal and the FPCB 210 for a DC electrical signal may be mounted in a vertical direction based on a determined gap by the height of an electrical connection unit of the bidirectional optical transmission/reception module 100. In this case, the cross-section A-A' with respect to FIG. 4A is illustrated in FIG. 4B.

As mentioned previously, the FPCB 200 for a high-speed electrical signal of the present disclosure may be deployed on different sides of an electrical signal line of an optical transmission channel and the electrical signal line of an optical reception channel as illustrated in FIG. 4B to reduce electrical crosstalk generated between the optical transmission channel (Tx) and the optical reception channel (Rx).

In this case, on the FPCB 210 for a DC electrical signal mounted in a vertical direction on an FPCB 200 for a high-speed electrical signal, a ground may be applied to a surface facing the FPCB 200 for a high-speed electrical signal in order to minimize an influence of a high-speed electrical signal on the DC electrical signal.

Figure 5A:
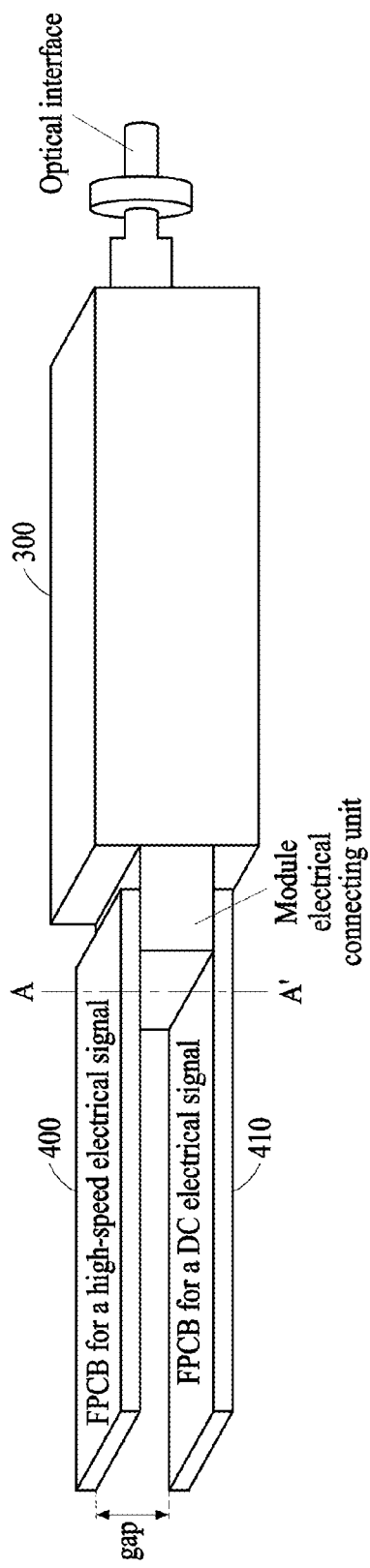
FIGS. 5A and 5B are diagrams illustrating a structure of an FPCB applicable to an optical transmission/reception module using a plurality of channels according to another example embodiment.
Figure 5B:
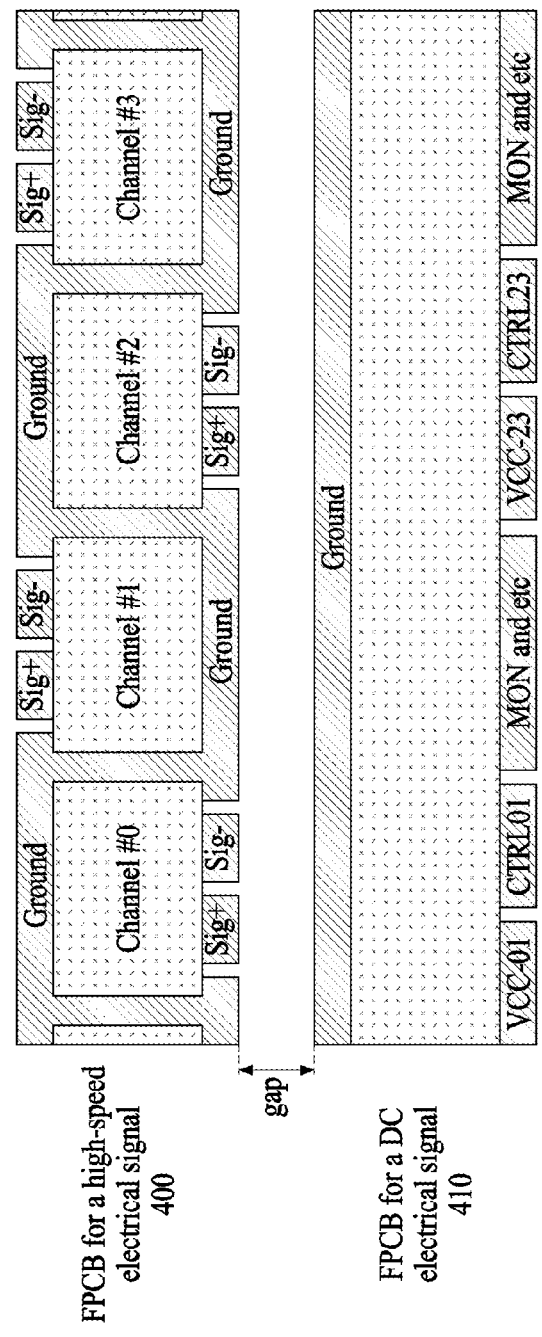

FIGS. 5A and 5B are diagrams illustrating a structure of the FPCB applicable to an optical transmission/reception module using a plurality of channels according to another example embodiment.

FIGS. 5A and 5B are diagrams illustrating a structure of the FPCB that may be applied to the optical transmission/reception module 300 that uses a plurality of channels rather than the bidirectional optical transmission/reception module 100. The optical transmission/reception module 300 using a plurality of channels may have a structure that is optically coupled to one optical fiber when there is a wavelength multiplexing/demultiplexing function as illustrated in FIG. 5A. Meanwhile, the optical transmission/reception module 300 using a plurality of channels may have a parallel connection structure that is optically coupled to the number of optical fibers corresponding to a plurality of channels when there is no wavelength multiplexing/demultiplexing function. In this case, the cross-section A-A' with respect to FIG. 5A is illustrated in FIG. 5B.

On the FPCB 400 for a high-speed electrical signal mounted on the optical transmission/reception module 300 using a plurality of channels proposed in the present disclosure, an electrical signal line for an optical transmission signal of a plurality of channels or an electrical signal line for an optical reception signal of a plurality of channels may be deployed in a zigzag pattern on different sides.

For example, on the FPCB 400 for a high-speed electrical signal as illustrated in FIG. 5B, electrical crosstalk between very adjacent channels may be minimized by deploying an electrical signal line for an optical transmission signal or an electrical signal line for an optical reception signal for four channels in an up-and-down zigzag structure.

In this case, on the FPCB 410 for a DC electrical signal mounted in a vertical direction of the FPCB 400 for a high-speed electrical signal, a ground may be applied to a surface facing the FPCB 400 for a high-speed electrical signal in order to minimize the effect of a high-speed electrical signal on the DC electrical signal.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. An optical submodule comprising:
   an optical transmission/reception module that optically couples an optical transmission signal of a plurality of channels and an optical reception signal of a plurality of channels in one optical fiber or a number of optical fibers corresponding to a plurality of channels;
   an FPCB for a high-speed electrical signal mounted on the optical transmission/reception module that performs as an electrical signal interface with a main board; and
   an FPCB for a DC electrical signal,
   wherein an electrical signal line for an optical transmission signal of the plurality of channels or an electrical signal line for an optical reception signal of the plurality of channels is deployed in an alternating zigzag pattern on different sides on the FPCB for a high-speed electrical signal,
   wherein the electrical signal line for the optical transmission signal of the plurality of channels or the electrical signal line for the optical reception signal of the plurality of channels are formed in a same direction as the direction of travel of the optical transmission signal and the optical reception signal above.

2. The optical submodule of claim 1, wherein the FPCB for the high-speed electrical signal and the FPCB for the DC electrical signal are mounted in a form facing each other in a vertical direction.

3. The optical submodule of claim 1, wherein a ground is applied to a surface facing the FPCB for the high-speed electrical signal on the FPCB for the DC electrical signal.

* * * * *